(12) United States Patent
Walters et al.

(10) Patent No.: US 10,227,847 B2
(45) Date of Patent: Mar. 12, 2019

(54) RESERVOIR SIMULATOR, METHOD AND COMPUTER PROGRAM PRODUCT TO DETERMINE PROPPANT DAMAGE EFFECTS ON WELL PRODUCTION

(71) Applicant: Landmark Graphics Corporation, Houston, TX (US)

(72) Inventors: Harold Grayson Walters, Tomball, TX (US); Terry Wayne Wong, Houston, TX (US); Dominic Camilleri, Houston, TX (US); Amit Kumar, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 507 days.

(21) Appl. No.: 14/900,745

(22) PCT Filed: Aug. 30, 2013

(86) PCT No.: PCT/US2013/057635
§ 371 (c)(1),
(2) Date: Dec. 22, 2015

(87) PCT Pub. No.: WO2015/030807
PCT Pub. Date: Mar. 5, 2015

(65) Prior Publication Data
US 2016/0145976 A1    May 26, 2016

(51) Int. Cl.
*G06G 7/48* (2006.01)
*E21B 43/00* (2006.01)
*E21B 43/267* (2006.01)
*E21B 43/26* (2006.01)
*E21B 47/00* (2012.01)
*G06F 17/10* (2006.01)

(52) U.S. Cl.
CPC .............. *E21B 43/00* (2013.01); *E21B 43/26* (2013.01); *E21B 43/267* (2013.01); *E21B 47/00* (2013.01); *G06F 17/10* (2013.01)

(58) Field of Classification Search
CPC .......... G06F 17/10; E21B 43/00; E21B 43/26; E21B 43/267; E21B 47/00
USPC ...................................................... 703/9, 10
See application file for complete search history.

(56) References Cited

U.S. PATENT DOCUMENTS 6,795,773 B2  9/2004 Soliman et al.
8,301,426 B2  10/2012 Abasov et al.
(Continued)

OTHER PUBLICATIONS

International Search Report and the Written Opinion of the International Searching Authority, or the Declaration, dated Jan. 15, 2014, PCT/US2013/057635, 10 pages, ISA/US.
(Continued)

*Primary Examiner* — Andre Pierre Louis
(74) *Attorney, Agent, or Firm* — Haynes and Boone, LLP

(57) ABSTRACT

A reservoir simulator system models the effect of proppant damage on reservoir production through calculation of a fracture closure stress versus fracture permeability relationship, which is mathematically transformed into a pore pressure versus fracture permeability relationship. Based upon the pore pressure relationship, the system models reservoir production while taking into account the permeability reduction in the fractures brought about due to proppant damage.

14 Claims, 4 Drawing Sheets

(56) References Cited

U.S. PATENT DOCUMENTS

| | | | |
|---|---|---|---|
| 2010/0066560 A1* | 3/2010 | McDaniel | E21B 43/267 340/854.9 |
| 2010/0299111 A1* | 11/2010 | Dale | E21B 47/00 703/2 |
| 2011/0061860 A1 | 3/2011 | Dean et al. | |
| 2011/0125476 A1 | 5/2011 | Craig | |

OTHER PUBLICATIONS

Settari, A.T., et al., "A Coupled Reservoir and Geomechanical Simulation System," Society of Petroleum Engineers Reservoir Simulation Symposium, Feb. 12-15, 1995, San Antonio, Texas, USA, Society of Petroleum Engineer Journal, Sep. 1998, pp. 219-226.

Settari, A.T., et al., "How to Approximate Effects of Geomechanics in Conventional Reservoir Simulation," Society of Petroleum Engineers Annual Technical Conference and Exhibition, Oct. 9-12, 2005, Dallas, Texas, USA.

Valkó, P.P., Hydraulic Fracturing, Short Course, Texas A&M University, College Station, 2005; Fracture Design, Fracture Dimensions, Fracture Modeling; Short Course [online], [retrieved on Dec. 22, 2013].

* cited by examiner

US 10,227,847 B2

RESERVOIR SIMULATOR, METHOD AND COMPUTER PROGRAM PRODUCT TO DETERMINE PROPPANT DAMAGE EFFECTS ON WELL PRODUCTION

The present application is a U.S. National Stage patent application of International Patent Application No. PCT/US2013/057635, filed on Aug. 30, 2013, the benefit of which is claimed and the disclosure of which is incorporated herein by reference in its entirety.

FIELD OF THE INVENTION

The present invention relates generally to hydrocarbon reservoir analysis and, more specifically, to a reservoir simulator which models proppant damage effects on reservoir production.

BACKGROUND

In hydrocarbon exploration, accurately understanding the economic projections of a reservoir is vitally important. Conventional approaches include the use of reservoir simulators which predict production behavior and, hence, cashflow from a well. In addition to the reservoir simulators, however, geomechanical calculations are also required to account for the reduction in proppant permeability (i.e., proppant damage) over time—which directly effects production. In conventional reservoir simulators, to model this effect engineers utilize compaction tables, so called because they were developed to model compaction effects consisting of pressure versus transmissibility and pore volume relationships.

In conventional thought, laboratory tests and physical theory suggest that permeability in proppant packs is a function of closure stress and pore pressure. The disadvantage to this approach is that calculating closure stress and analyzing the laboratory-determined relationships between fracture permeability and closure stress directly would be too computationally demanding on the reservoir simulator, and would require more data than typically available. Therefore, it would be much more practical to develop a reservoir simulator which somehow utilizes the fracture permeability versus closure stress relationship in a computationally efficient manner. To date, however, no solution has been presented to the industry.

In view of the foregoing, there is a need in the art for a reservoir simulator that converts the fracture permeability versus closure stress relationship to a fracture permeability verses pore pressure relationship, and vice versa, in order to predict proppant damage on production, to thereby provide a more accurate economic projection of the reservoir.

DESCRIPTION OF ILLUSTRATIVE EMBODIMENTS

Illustrative embodiments and related methodologies of the present invention are described below as they might be employed in a reservoir simulator which models production while taking proppant damage effects into account. In the interest of clarity, not all features of an actual implementation or methodology are described in this specification. Also, the "exemplary" embodiments described herein refer to examples of the present invention. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
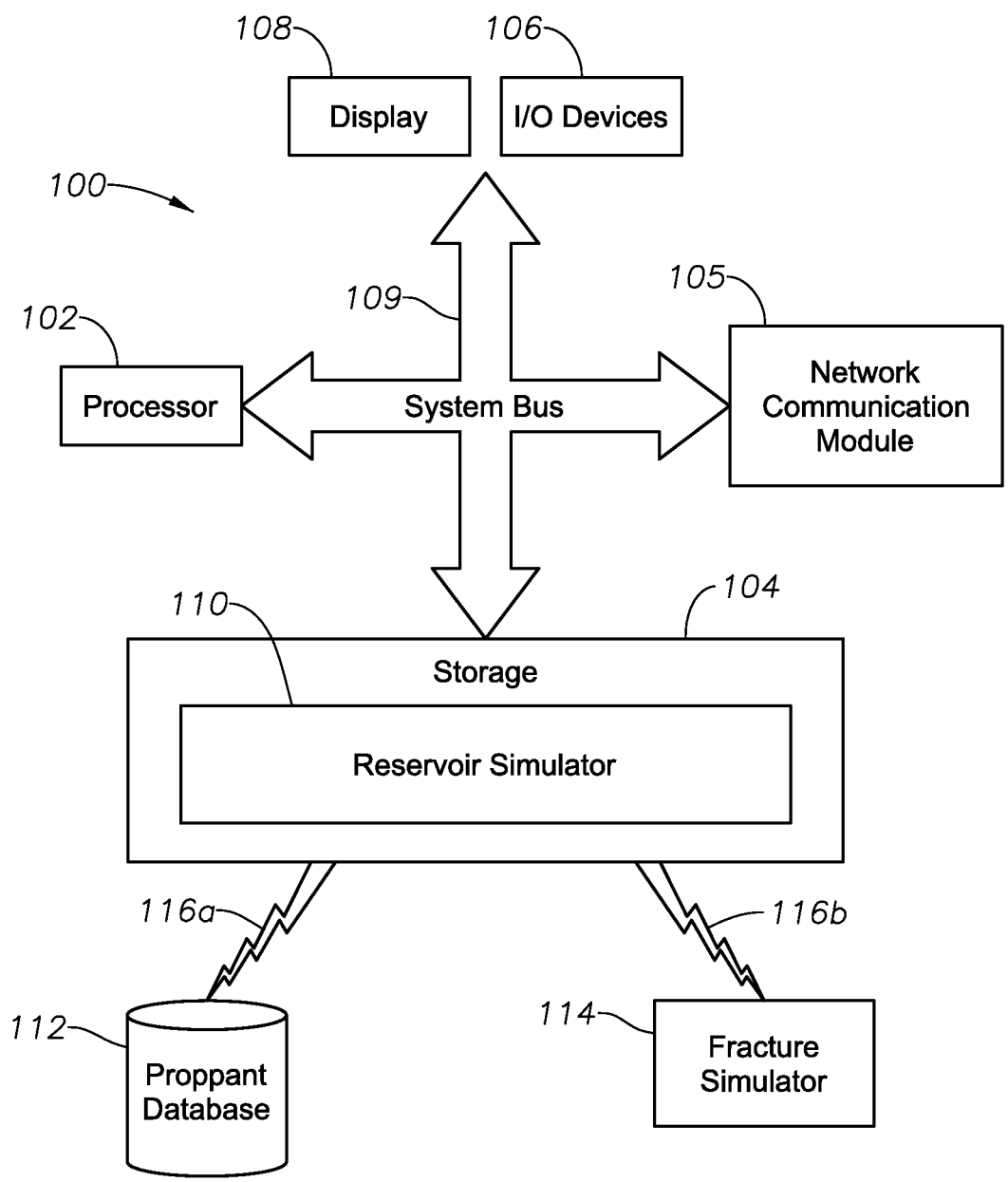
FIG. 1 illustrates a block diagram of a reservoir simulation system according to certain exemplary embodiments of the present invention.

FIG. 1 shows a block diagram of a reservoir simulation system 100 according to certain exemplary embodiments of the present invention. As will be described herein, exemplary embodiments of the present invention describe a reservoir simulator which models the effect of proppant damage on reservoir production. More specifically, exemplary reservoir simulators calculate a fracture closure stress versus fracture permeability relationship, and transform it into a pore pressure versus fracture permeability relationship. Based upon the pore pressure relationship, the simulator dynamically models reservoir production, while taking into account the permeability reduction in the fractures brought about due to proppant damage over time. Accordingly, through use of the present invention, the effects of proppant damage are modeled in a reservoir simulator through a workflow that allows reservoir engineers to utilize results of fracture modeling, whether bi-wing or complex networks, directly in reservoir simulator calculations.

Referring to FIG. 1, exemplary reservoir simulation system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within reservoir simulator 110 in accordance with the exemplary embodiments described herein, may be stored in storage 104 or some other computer-readable medium. Although not explicitly shown in FIG. 1, it will be recognized that reservoir simulation system 100 may be connected to one or more public and/or private networks via one or more appropriate network connections. It will also be recognized that the software instructions comprising reservoir simulator 110 may also be loaded into storage 104 from a CD-ROM or other appropriate storage media via wired or wireless methods.

Moreover, those ordinarily skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof in a computer system or other processing system.

Exemplary embodiments of reservoir simulator 110 models production of a desired wellbore such as, for example, a multi-lateral well. Reservoir simulator 110 is also useful in optimizing and designing various well treatments such as, for example, fracturing and sand control. As will be described below, reservoir simulator 110 generates a graphical user interface for entering and rendering complex data required for accurate numerical simulation. Through use of the graphical user interface, a user may enter data, launch the reservoir simulation, monitor the simulation run, and analyze the results. Exemplary reservoir simulation platforms include, for example, QuikLook® or Nexus®.

Figure 2:
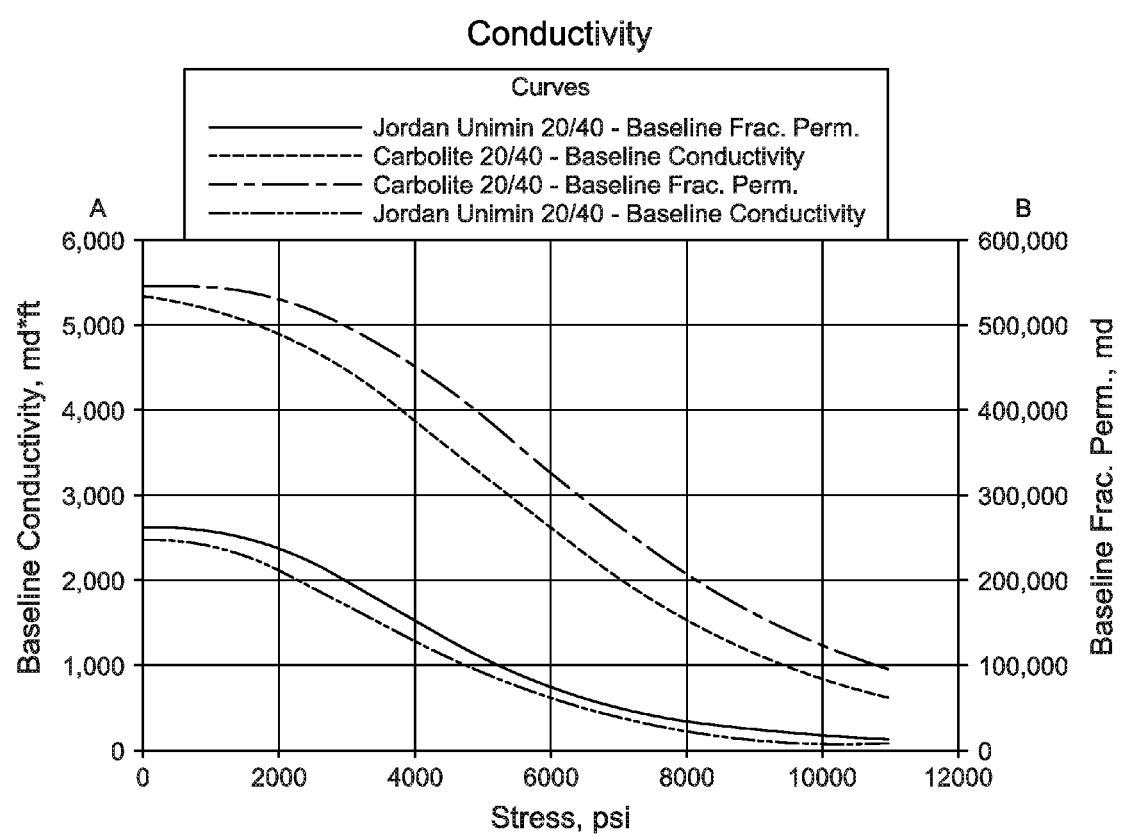
FIG. 2 is a conductivity plot taken from an exemplary experimental conductivity study which plots fracture closure stress versus baseline conductivity and baseline fracture permeability.

Still referring to FIG. 1, reservoir simulator 110 is in communication with proppant database 112 via link 116a, which may be any wired or wireless link. Proppant database 112 provides robust data retrieval and integration of data related to proppant damage behavior which is communicated to reservoir simulator 110 in order to carry out the functions of the present invention. As will be understood by those ordinarily skilled in the art having the benefit of this disclosure, such proppant damage data may include correlations or tables of permeability as a function of stress that are derived from laboratory fracture conductivity studies. FIG. 2 is a conductivity plot taken from an exemplary experimental conductivity study which plots fracture closure stress versus baseline conductivity and baseline fracture permeability. One exemplary database containing such proppant damage behavioral data is the Predict-K Library offered by Core Laboratories or the Halliburton Material Library. Nevertheless, using such a conductivity plot, permeability versus closure stress relationships may be ascertained for a certain proppant type or mixtures of proppant given the temperature, fracture dimensions, concentration (or width) and mass fractions. In FIG. 2, two different exemplary proppant types are plotted, Jordan Unimin 20/40 and CarboLite 20/40, along with their respective baseline conductivity and fracture permeability versus fracture closure stress relationships. As described in further detail below, reservoir simulator 110 will ultimately transform this stress based relationship into a pressure based relationship whereby the dynamic effects of proppant damage on production are modeled.

Reservoir simulator 110 is also in communication with fracture simulator 114 via link 116b, which is also a wired or wireless communications link. Alternatively, however, both proppant database 112 and fracture simulator 114 may be embedded inside reservoir simulator 110, as would be understood by those ordinarily skilled in the art having the benefit of this disclosure. Nevertheless, fracture simulator 114 models fracture growth behavior during the fracturing process, and provide this fracture characteristic data as output to reservoir simulator 110. Such characteristic data may include, for example, the geometry and properties (permeability and porosity, for example) of the fractures which can be calibrated to a specific fracture job schedule, which also takes into account the proppant type (whether a single or mixed proppant). Fracture simulator 114 will provide the characteristic data on grids that may be mapped to the grid used by reservoir simulator 110. Thereafter, as will be described below, reservoir simulator 110 proceeds with calculations once the appropriate reduction in the proppant-filled fracture permeability has been modeled using the inventive algorithms of the present invention. Exemplary commercially available fracture simulation platforms include, for example, Halliburton Savvy®, FracProPT®, StimPlan or GOHFER®.

Referring back to FIG. 1, in certain exemplary embodiments, reservoir simulator 110 may also store (or upload from a remote location) historical and real-time reservoir related data that spans across all aspects of the well planning, construction and completion processes such as, for example, drilling, cementing, wireline logging, well testing and stimulation. Moreover, such data may include, for example, open hole logging data, well trajectories, petrophysical rock property data, surface data, fault data, data from surrounding wells, data inferred from geostatistics, etc. An exemplary database platform is, for example, the INSITE® software suite, commercially offered through Halliburton Energy Services Inc. of Houston Tex. Those ordinarily skilled in the art having the benefit of this disclosure realize there are a variety of software platforms and associated systems to retrieve, store and integrate the well related data, as described herein.

Still referring to the exemplary embodiment of FIG. 1, reservoir simulator 110 may also include an earth modeling module (not shown) that integrates the proppant damage and other wellbore data in order to provide subsurface stratigraphic visualization including, for example, geo science interpretation, petroleum system modeling, geochemical analysis, stratigraphic gridding, facies, net cell volume, and petrophysical property modeling. Exemplary earth modeling platforms include, for example, DecisionSpace®, which is commercially available through the Assignee of the present invention, Landmark Graphics Corporation of Houston, Tex. However, those ordinarily skilled in the art having the benefit of this disclosure realize a variety of other earth modeling platforms may also be utilized with the present invention.

Moreover, reservoir simulator 110 may also include multi-domain workflow automation capabilities that may connect any variety of desired technical applications. As such, the output from one application, or module, may become the input for another, thus providing the capability to analyze how various changes impact the well placement and/or fracture design. Those ordinarily skilled in the art having the benefit of this disclosure realize there are a variety of workflow platforms which may be utilized for this purpose.

Figure 3:
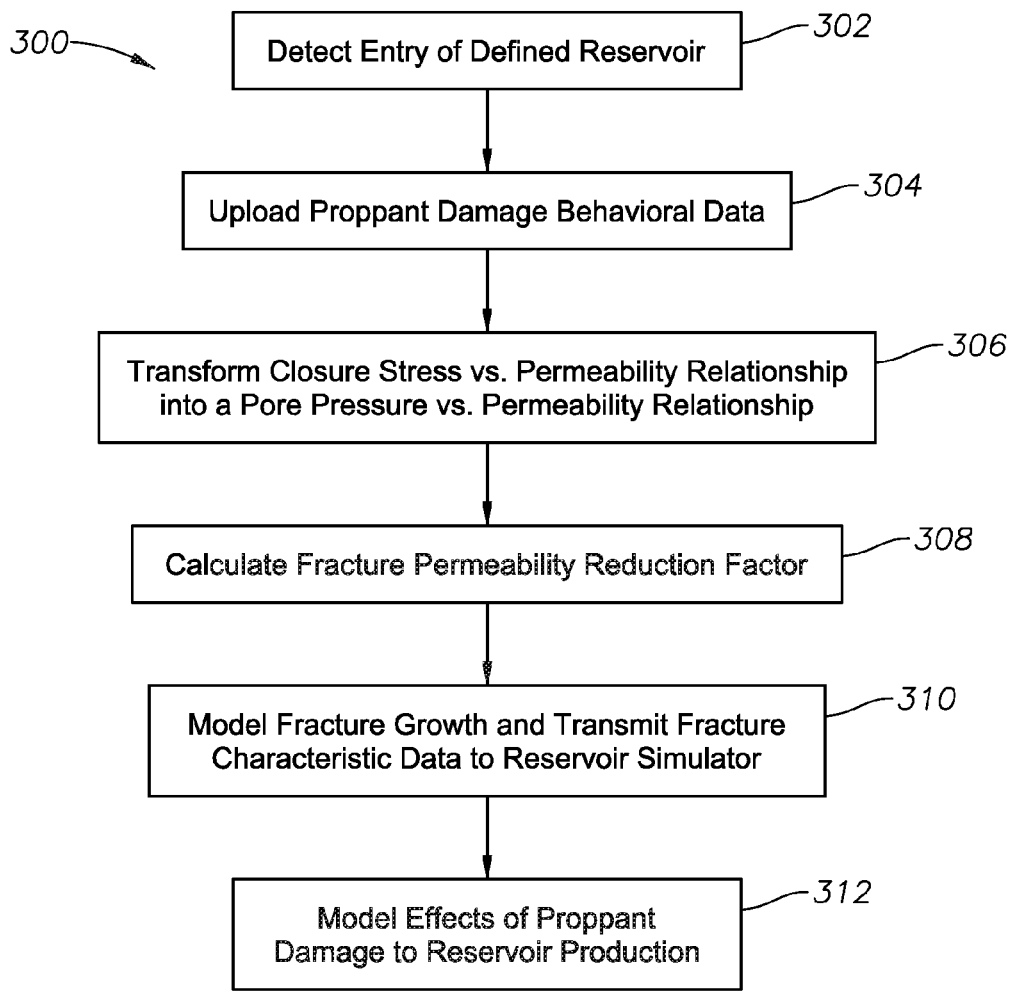
FIG. 3 is a flow chart of a method to model proppant damage effects on reservoir production, according to certain exemplary methodologies of the present invention.

Referring to FIG. 3, exemplary methodologies of the present invention utilized to model proppant damage effects on reservoir production will now be described. Referring to method 300, at block 302, reservoir simulator 110 detects entry of a defined reservoir to be simulated. Such entry may be entered into a graphical user interface, for example, using a collection of coordinates that depict the geographical boundaries of the reservoir along the surface and/or subsurface of the reservoir model, as understood in the art. In addition to geographical boundaries, overall reservoir model including, for example, the well plan (bi-wing or complex fracture network, for example), fracture geometries, and type of proppant to be utilized are also defined. In certain embodiments, the proppant may be a single proppant type or a mixture of proppant. In other embodiments, a portion or all of the reservoir definition data may be uploaded from local or remote databases. Nevertheless, once defined, reservoir simulator 110 will then utilize the defined reservoir as the basis for the remainder of the analysis and simulation in which proppant damage effects on reservoir production will be modeled.

At block 304, reservoir simulator 110 uploads proppant damage behavioral data from proppant database 112 in order to begin the analysis. The proppant damage behavioral data reflects, for example, the intergranular stresses on the proppant which, over time, result in the crushing or compacting (i.e., damaging) of the proppant, thus resulting in decreased permeability and production. As discussed above in relation to FIG. 2, in this exemplary embodiment, the data correlates the fracture closure stress versus fracture permeability relationship for the proppant defined in block 302.

Now that reservoir simulator 110 has uploaded the data reflecting the fracture closure stress versus fracture permeability relationships, at block 306, reservoir simulator 110 then transforms that relationship into a pore pressure versus fracture permeability relationship. To achieve this transformation, in certain exemplary embodiments, reservoir simulator 110 takes advantage of the relationship between the variables as captured in the following equation:

$$\sigma'_p = \frac{v}{1-v}\sigma_v + \left(\alpha\left(1 - \frac{v}{1-v}\right) - \alpha_p\right)p + E\varepsilon, \quad \text{Eq. (1)}$$

where $\sigma'_p$ is the net or effective intergranular stress on the proppant pack (i.e., the fracture closure stress), $\alpha$ is Biot's constant, $\alpha_p$ is Biot's constant for the proppant pack, p is the pore pressure, $\sigma_v$ is the overburden stress, $v$ is poisson's ratio, E is young's modulus, and $\varepsilon$ is the regional tectonic strain. For example, with the values of:

$$v = \frac{1}{4} \text{ and } \alpha = \alpha_p = 1,$$

Eq.(1) yields the following relationship:

$$\sigma'_p = \frac{1}{3}\sigma_v - \frac{1}{3}p + E\varepsilon. \quad \text{Eq. (2)}$$

The relationship of Eq.(2) illustrates that the fracture closure stress and pore pressure are inversely proportional. Also, as shown in FIG. 2, the fracture closure stress and permeability are inversely proportional.

Fracture permeability can change over time. A fracture permeability ratio can be defined as:

$$\frac{k_{frac}}{k_{frac0}}, \quad \text{Eq. (3)}$$

where $k_{frac}$ represents the fracture permeability and $k_{frac0}$ represents the initial fracture permeability. Eq. (3) is referred to as the fracture permeability reduction factor.

At block 308, reservoir simulator 110 then calculates a fracture permeability reduction factor using the fracture permeability ratio (which was generated based upon the pore pressure versus fracture permeability relationship). At block 310, fracture simulator 114 models the growth of the fractures along the defined reservoir to thereby generate the fracture characteristic data and then transmits the data to reservoir simulator 110. In certain exemplary embodiments, fracture characteristic data includes, for example, fracture geometry, porosity or permeability data.

Still referring to the exemplary methodology of FIG. 3, at block 312, reservoir simulator 110 models the post-fracture production of the wellbore using the fracture permeability reduction factor and the fracture characteristic data. By doing so, the effects of proppant damage to the permeability of the fracture are determined. Accordingly, through use of the present invention, the geomechanical calculations required to account for reduction in fracture permeability are performed in the reservoir simulation process.

As an exemplary application of method 300, the following input data may be input into reservoir simulation system 100:

Poisson: 0.25
Young: 2.76 E+10 Pa
Biot: 1
Biotprop: 1
Strain: 1.00 E-06
Pressover: 3.45 E+07 Pa
Proptype: Jordan Unimin 20/40
Pressporeknt: 20
Pressporemin: 0 Pa
Pressporemax: 3.45 E+07 Pa
Temperature: 373.15 K Using this input data, reservoir simulator 110, through use of algorithms described herein, calculates the following values:

TABLE 1

| Pore Pressure (psi) | Closure Stress (psi) | Perm (mD) | kfrac/kfrac 0 |
| --- | --- | --- | --- |
| 0.00 | 1670.67 | 242345.67 | 1.0000 |
| 263.16 | 1582.95 | 244383.92 | 1.0084 |
| 526.32 | 1495.23 | 246274.21 | 1.0162 |
| 789.47 | 1407.51 | 248016.48 | 1.0234 |
| 1052.63 | 1319.79 | 249611.43 | 1.0300 |
| 1315.79 | 1232.07 | 251060.53 | 1.0360 |
| 1578.95 | 1144.35 | 252366.02 | 1.0413 |
| 1842.11 | 1056.63 | 253530.94 | 1.0462 |
| 2105.26 | 968.92 | 254559.06 | 1.0504 |
| 2368.42 | 881.20 | 255454.94 | 1.0541 |
| 2631.58 | 793.48 | 256223.87 | 1.0573 |
| 2894.74 | 705.76 | 256871.92 | 1.0599 |
| 3157.89 | 618.04 | 257405.92 | 1.0621 |
| 3421.05 | 530.32 | 257833.50 | 1.0639 |
| 3684.21 | 442.60 | 258163.12 | 1.0653 |
| 3947.37 | 354.88 | 258404.18 | 1.0663 |
| 4210.53 | 267.16 | 258567.15 | 1.0669 |
| 4473.68 | 179.44 | 258663.88 | 1.0673 |
| 4736.84 | 91.72 | 258708.20 | 1.0675 |
| 5000.00 | 4.00 | 258717.70 | 1.0676 |

Figure 4:
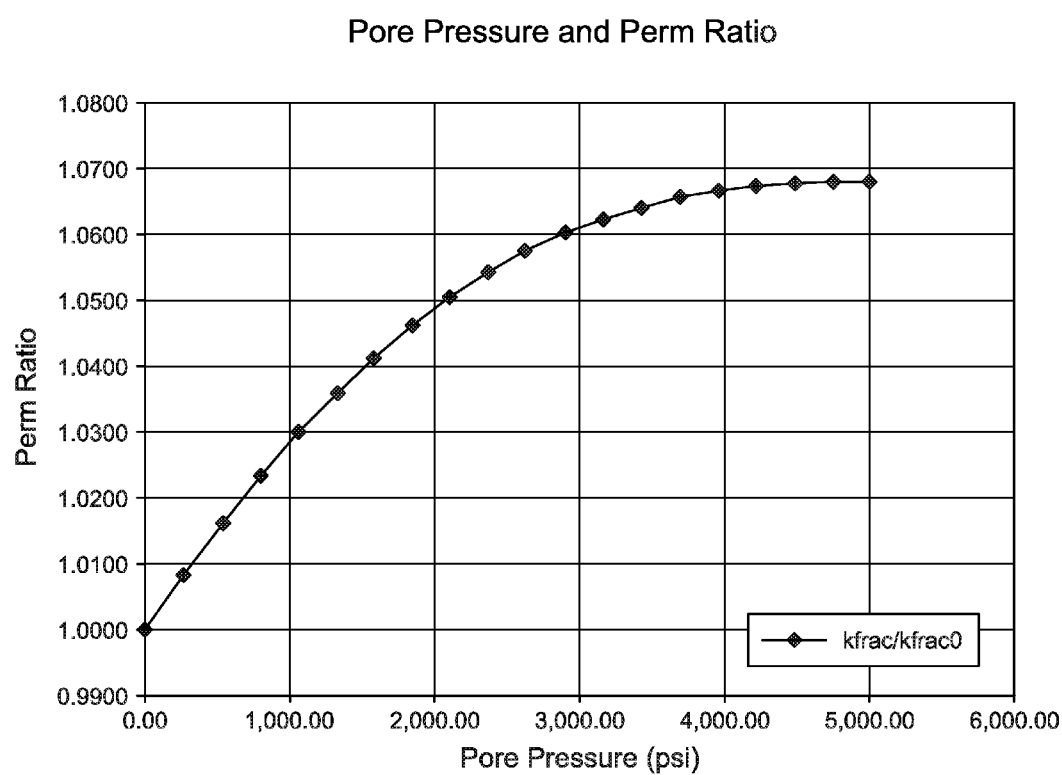
FIG. 4 is a graph plotting the pore pressure versus fracture permeability ratios calculated using the exemplary method of FIG. 3.

FIG. 4 is a graph plotting the pore pressure versus permeability ratios (i.e., fracture permeability reduction factors) that are reflected by the values of Table 1. FIG. 4 illustrates the permeability reduction factor as a function of pore pressure, a relationship that can directly be utilized by reservoir simulator 110 in calculations since simulator 110 calculates pressures and saturations of different fluid phases as the primary variables. Reservoir simulator 110 then utilizes these values to conduct simulation of reservoir production over time. Accordingly, the effects of proppant damage to fracture permeability are taken into account.

In certain other exemplary embodiments, reservoir simulator 110 may also calculate conductivity of the wellbore fracture as a function of pore pressure. Fracture conductivity is defined as the product of absolute permeability of the fracture and the width of the fracture. Since the width of the fracture is already entered as part of its geometry block 302, reservoir simulator 110 then utilizes the fracture permeability from the permeability-pressure relationship and multiplies it by the fracture width to calculate the fracture conductivity.

In certain other exemplary embodiments, reservoir simulator 110 may also calculate the width of the fracture as a function of pore pressure. Here, the conductivity may be measured experimentally for proppants along with the pack width, which is converted by reservoir simulator 110 into relationships such as those in the Material Library described herein. Such an embodiment would be especially useful in calculating non-darcy (Forchheimer) flow effects.

In addition to converting closure stress data into pore pressure data, certain exemplary embodiments of the present invention may also convert pore pressure into closure stress data by altering Equation 1 to solve for pore pressure p, as would be understood by those ordinarily skilled in the art having the benefit of this disclosure.

The foregoing methods and systems described herein are particularly useful in planning, altering and/or drilling wellbores. As described, the system predicts the effects of proppant damage to well production for one or more wells over a defined hydrocarbon play. Thereafter, using the present invention, a well may be simulated, planned, or an existing wellbore may be altered in real-time and/or further operations may be altered. In addition, well equipment may be identified and prepared based upon the determined well placement, and the wellbore is drilled, stimulated, altered, completed, fractured, and/or otherwise produced in accordance to the determined well placement or stimulation plan.

The present invention provides a number of advantages. First, for example, conventional reservoir simulators do not calculate closure stress on a fracture and, thus, cannot directly use the closure stress versus permeability relationship. However, the present invention does calculate the required permeability reduction in the fractures as a function of pore pressure, which then allows it to simulate the proppant damage effects on production. Second, the present invention provides a workflow by which engineers may utilize the results of fracture modeling along with the proppant damage effect. Third, the present invention provides a method by which to model proppant damage effects for proppant mixtures, which is currently unavailable in conventional methods.

Embodiments described herein further relate to any one or more of the following paragraphs:

1. A computer-implemented method to model proppant damage effects on a wellbore fracture using a reservoir simulator, the method comprising: uploading proppant damage behavior data into the reservoir simulator, the proppant damage behavior data comprising data reflecting a fracture closure stress versus fracture permeability relationship for a defined proppant type; using the reservoir simulator to: transform the fracture closure stress versus fracture permeability relationship into a pore pressure versus fracture permeability relationship; and calculate a fracture permeability reduction factor using the pore pressure versus fracture permeability relationship; modeling growth of the wellbore fracture using a fracture simulator, thereby generating fracture characteristic data; communicating the fracture characteristic data to the reservoir simulator; and modeling production of the wellbore using the reservoir simulator, the production model being based upon the fracture permeability reduction factor and the fracture characteristic data, thereby modeling the proppant damage effects on the wellbore.

2. A computer-implemented method as defined in paragraph 1, wherein transforming the fracture closure stress versus fracture permeability relationship into the pore pressure versus fracture permeability relationship is achieved using a relationship defined by:

$$\sigma'_p = \frac{v}{1-v}\sigma_v + \left(\alpha\left(1 - \frac{v}{1-v}\right) - \alpha_p\right)p + E\varepsilon.$$

3. A computer-implemented method as defined in paragraphs 1 or 2, wherein the fracture permeability reduction factor is calculated using a fracture permeability ratio as defined by:

$$\frac{k_{frac}}{k_{frac0}}.$$

4. A computer-implemented method as defined in any of paragraphs 1-3, wherein the fracture characteristic data comprises at least one of a fracture geometry, fracture permeability or fracture porosity.

5. A computer-implemented method as defined in any of paragraphs 1-4, further comprising utilizing the reservoir simulator to calculate conductivity of the wellbore fracture as a function of pore pressure.

6. A computer-implemented method as defined in any of paragraphs 1-5, wherein calculating the conductivity of the wellbore fracture as a function of pore pressure is achieved by multiplying fracture width by the fracture permeability reduction factor.

7. A computer-implemented method as defined in any of paragraphs 1-6, further comprising utilizing the reservoir simulator to calculate width of the wellbore fracture as a function of pore pressure.

8. A computer-implemented method as defined in any of paragraphs 1-7, wherein the defined proppant type comprises a single proppant or a mixture of proppants.

9. A computer-implemented method as defined in any of paragraphs 1-8, further comprising utilizing the production model to perform at least one of: fracturing a formation; producing from a formation; or developing a field.

10. A system comprising processing circuitry to implement any of the methods in any of paragraphs 1-9.

11. A computer program product comprising instructions which, when executed by at least one processor, causes the processor to perform any of the methods in any of paragraphs 1-9.

12. A computer-implemented method to model proppant damage effects on a wellbore fracture using a reservoir simulator, the method comprising: calculating closure stress data on the wellbore fracture; transforming the closure stress data into pore pressure data; and calculating a reduction in permeability of the wellbore fracture as a function of the pore pressure, thereby modeling the proppant damage effects on the wellbore.

13. A computer-implemented method as defined in paragraph 12, wherein transforming the fracture closure stress data into pore pressure data is achieved using a relationship defined by:

$$\sigma'_p = \frac{v}{1-v}\sigma_v + \left(\alpha\left(1 - \frac{v}{1-v}\right) - \alpha_p\right)p + E\varepsilon.$$

14. A computer-implemented method as defined in any of paragraphs 12 or 13, wherein calculating the reduction in permeability further comprises calculating a fracture permeability reduction factor defined as:

$$\frac{k_{frac}}{k_{frac0}}.$$

15. A method of completing a well by modeling proppant damage effects on a wellbore fracture using a reservoir simulator, the method comprising: uploading proppant damage behavior data into the reservoir simulator, the proppant damage behavior data comprising data reflecting a fracture closure stress versus fracture permeability relationship for a defined proppant type; using the reservoir simulator to: transform the fracture closure stress versus fracture permeability relationship into a pore pressure versus fracture permeability relationship; and calculate a fracture permeability reduction factor using the pore pressure versus fracture permeability relationship; modeling growth of the wellbore fracture using a fracture simulator, thereby generating fracture characteristic data; communicating the fracture characteristic data to the reservoir simulator; modeling production of the wellbore using the reservoir simulator, the production model being based upon the fracture permeability reduction factor and the fracture characteristic data, thereby modeling the proppant damage effects on the wellbore; and utilizing the modeled proppant damage effects on the wellbore to select a proppant for use in the well completion and for designing a fracture treatment plan for the well.

16. A method of developing a hydrocarbon field by modeling proppant damage effects on a wellbore fracture using a reservoir simulator, the method comprising: uploading proppant damage behavior data into the reservoir simulator, the proppant damage behavior data comprising data reflecting a fracture closure stress versus fracture permeability relationship for a defined proppant type; using the reservoir simulator to: transform the fracture closure stress versus fracture permeability relationship into a pore pressure versus fracture permeability relationship; and calculate a fracture permeability reduction factor using the pore pressure versus fracture permeability relationship; modeling growth of the wellbore fracture using a fracture simulator, thereby generating fracture characteristic data; communicating the fracture characteristic data to the reservoir simulator; modeling production of the wellbore using the reservoir simulator, the production model being based upon the fracture permeability reduction factor and the fracture characteristic data, thereby modeling the proppant damage effects on the wellbore; and utilizing the modeled proppant damage effects on the wellbore to select proppants for use in the field development and for designing fracture treatment plans for the wells drilled within the field development.

Furthermore, the exemplary methodologies described herein may be implemented by a system comprising processing circuitry or a computer program product comprising instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A computer-implemented method to model proppant damage effects on a wellbore fracture using a reservoir simulator, the method comprising:
    drilling a wellbore into a formation containing a reservoir;
    uploading proppant damage behavior data into the reservoir simulator, the proppant damage behavior data comprising data reflecting a fracture closure stress versus fracture permeability relationship for a defined proppant type;
    using the reservoir simulator to:
        transform the fracture closure stress versus fracture permeability relationship into a pore pressure versus fracture permeability relationship, wherein transforming the fracture closure stress versus fracture permeability relationship into the pore pressure versus fracture permeability relationship is achieved using a relationship defined by:

$$\sigma'_p = \frac{v}{1-v}\sigma_v + \left(\alpha\left(1 - \frac{v}{1-v}\right) - \alpha_p\right)p + E\varepsilon;$$

where $\sigma'_p$ is the net intergranular stress on proppant, $\alpha$ is Biot's constant, $\alpha_p$ is Biot's constant for the proppant, $p$ is the pore pressure, $\sigma v$ is the overburden stress, $\upsilon$ is Poisson's ratio, E is Young's modulus, and $\varepsilon$ is regional tectonic strain; and
    calculate a fracture permeability reduction factor using the pore pressure versus fracture permeability relationship;
    modeling growth of the wellbore fracture using a fracture simulator, thereby generating fracture characteristic data;
    communicating the fracture characteristic data to the reservoir simulator;
    modeling production of the wellbore using the reservoir simulator, the production model being based upon the fracture permeability reduction factor and the fracture characteristic data, thereby modeling the proppant damage effects on the reservoir;
    selecting a proppant based on the production model;
    designing a fracture treatment plan for the
    drilled uwellbore; and
    utilizing the selected proppant and designed fracture treatment plan to fracture the formation containing the drilled wellbore and produce from the drilled wellbore.

2. A computer-implemented method as defined in claim 1, wherein the fracture permeability reduction factor is calculated using a fracture permeability ratio as defined by:

$$\frac{k_{frac}}{k_{frac0}}.$$

3. A computer-implemented method as defined in claim 1, wherein the fracture characteristic data comprises at least one of a fracture geometry, fracture permeability or fracture porosity.

4. A computer-implemented method as defined in claim 1, further comprising utilizing the reservoir simulator to calculate conductivity of the wellbore fracture as a function of pore pressure.

5. A computer-implemented method as defined in claim 4, wherein calculating the conductivity of the wellbore fracture as a function of pore pressure is achieved by multiplying fracture width by the fracture permeability reduction factor.

6. A computer-implemented method as defined in claim 1, further comprising utilizing the reservoir simulator to calculate width of the wellbore fracture as a function of pore pressure.

7. A computer-implemented method as defined in claim 1, wherein the defined proppant type comprises a single proppant or a mixture of proppants.

8. A computer-implemented method as defined in claim 1, further comprising utilizing the production model to perform at least one of:
fracturing a formation;
producing from a formation; or
developing a field.

9. A system comprising processing circuitry to implement the method of claim 1.

10. A computer program product comprising a non-transitory computer-readable medium storing instructions which, when executed by at least one processor, causes the processor to perform the method of claim 1.

11. A computer-implemented method to model proppant damage effects on a wellbore fracture using a reservoir simulator, the method comprising:
drilling a wellbore into a formation containing a reservoir;
calculating closure stress data on the wellbore fracture;
transforming the closure stress data into pore pressure data, wherein transforming the fracture closure stress data into pore pressure data is achieved using a relationship defined by:

$$\sigma'_p = \frac{v}{1-v}\sigma_v + \left(\alpha\left(1 - \frac{v}{1-v}\right) - \alpha_p\right)p + E\varepsilon;$$

where $\sigma'_p$ is the net intergranular stress on proppant, $\alpha$ is Biot's constant, $\alpha_p$ is Biot's constant for the proppant, $p$ is the pore pressure, $\sigma v$ is the overburden stress, $v$ is Poisson's ratio, $E$ is Young's modulus, and $\varepsilon$ is regional tectonic strain; and
calculating a reduction in permeability of the wellbore fracture as a function of the pore pressure, thereby modeling the proppant damage effects on the reservoir;
utilizing the modeled proppant damage effects on the reservoir to select a proppant for use in the well completion and for designing a fracture treatment plan for the drilled wellbore; and
utilizing the selected proppant and designed fracture treatment plan to fracture the formation containing the drilled wellbore and produce from the drilled wellbore.

12. A computer-implemented method as defined in claim 11, wherein calculating the reduction in permeability further comprises calculating a fracture permeability reduction factor defined as:

$$\frac{k_{frac}}{k_{frac0}}.$$

13. A method of completing a well by modeling proppant damage effects on a wellbore fracture using a reservoir simulator, the method comprising:
drilling a wellbore into a formation containing a reservoir;
uploading proppant damage behavior data into the reservoir simulator, the proppant damage behavior data comprising data reflecting a fracture closure stress versus fracture permeability relationship for a defined proppant type;
using the reservoir simulator to:
transform the fracture closure stress versus fracture permeability relationship into a pore pressure versus fracture permeability relationship, wherein transforming the fracture closure stress versus fracture permeability relationship into the pore pressure versus fracture permeability relationship is achieved using a relationship defined by:

$$\sigma'_p = \frac{v}{1-v}\sigma_v + \left(\alpha\left(1 - \frac{v}{1-v}\right) - \alpha_p\right)p + E\varepsilon;$$

where $\sigma'_p$ is the net intergranular stress on proppant, $\alpha$ is Biot's constant, $\alpha_p$ is Biot's constant for the proppant, $p$ is the pore pressure, $\sigma v$ is the overburden stress, $v$ is Poisson's ratio, $E$ is Young's modulus, and $\varepsilon$ is regional tectonic strain; and
calculate a fracture permeability reduction factor using the pore pressure versus fracture permeability relationship;
modeling growth of the wellbore fracture using a fracture simulator, thereby generating fracture characteristic data;
communicating the fracture characteristic data to the reservoir simulator;
modeling production of the reservoir through the drilled wellbore using the reservoir simulator, the production model being based upon the fracture permeability reduction factor and the fracture characteristic data, thereby modeling the proppant damage effects on the reservoir;
utilizing the modeled proppant damage effects on the reservoir to select a proppant for use in the well completion and for designing a fracture treatment plan for the drilled wellbore; and
utilizing the selected proppant and designed fracture treatment plan to to fracture the formation containing the drilled wellbore and produce from the drilled wellbore.

14. A method of developing a hydrocarbon field by modeling proppant damage effects on a wellbore fracture using a reservoir simulator, the method comprising:
drilling a wellbore into a formation containing a reservoir;
uploading proppant damage behavior data into the reservoir simulator, the proppant damage behavior data comprising data reflecting a fracture closure stress versus fracture permeability relationship for a defined proppant type;

using the reservoir simulator to:

transform the fracture closure stress versus fracture permeability relationship into a pore pressure versus fracture permeability relationship, wherein transforming the fracture closure stress versus fracture permeability relationship into the pore pressure versus fracture permeability relationship is achieved using a relationship defined by:

$$\sigma'_p = \frac{v}{1-v}\sigma_v + \left(\alpha\left(1 - \frac{v}{1-v}\right) - \alpha_p\right)p + E\varepsilon;$$

where $\sigma'_p$ is the net intergranular stress on proppant, $\alpha$ is Biot's constant, $\alpha_p$ is Biot's constant for the proppant, $\rho$ is the pore pressure, $\sigma v$ is the overburden stress, $\upsilon$ is Poisson's ratio, E is Young's modulus, and $\varepsilon$ is regional tectonic strain; and calculate a fracture permeability reduction factor using the pore pressure versus fracture permeability relationship;

modeling growth of the wellbore fracture using a fracture simulator, thereby generating fracture characteristic data;

communicating the fracture characteristic data to the reservoir simulator;

modeling production of the reservoir through the drilled wellbore using the reservoir simulator, the production model being based upon the fracture permeability reduction factor and the fracture characteristic data, thereby modeling the proppant damage effects on the reservoir;

utilizing the modeled proppant damage effects on the reservoir to select proppants for use in the field development and for designing fracture treatment plans for the drilled wellbore within the field development; and utilizing the selected proppant and designed fracture treatment plan to fracture the formation containing the drilled wellbore and produce from the drilled wellbore.

* * * * *